United States Patent [19]

Geissler et al.

[11] 4,443,840

[45] Apr. 17, 1984

[54] DC/DC CONVERTER

[75] Inventors: Klaus H. Geissler, Backnang; Karl-Heinz Hübner, Leutenbach, both of Fed. Rep. of Germany

[73] Assignee: Licentia Patent-Verwalstungs-GmbH, Frankfurt am Main, Fed. Rep. of Germany

[21] Appl. No.: 426,162

[22] Filed: Sep. 28, 1982

[30] Foreign Application Priority Data

Oct. 24, 1981 [DE] Fed. Rep. of Germany ....... 3142304

[51] Int. Cl.³ .......................................... H02M 3/335
[52] U.S. Cl. ..................................... 363/24; 363/134
[58] Field of Search ....................... 363/24, 26, 31, 41, 363/134, 139

[56] References Cited

U.S. PATENT DOCUMENTS 3,490,027   1/1970   Galetto et al. ....................... 363/24

OTHER PUBLICATIONS

"Stromversorgung von Satelliten-Wanderfeldrohren Hoher Leistung", von Günter Palz, Siemens Zeitschrift 48 (pp. 840–846).

Primary Examiner—William M. Shoop
Attorney, Agent, or Firm—Spencer & Frank

[57] ABSTRACT

A direct voltage-direct voltage converter including: a transformer having at least one primary winding and at least one secondary winding; first and second electronic switches connected to the primary winding; a rectifier unit connecting the secondary winding to a load; and switch control circuitry connected to the electronic switches for closing the switches periodically and in alternation at a selected repetition rate in response to pulses produced by a clock pulse generator, for applying a direct voltage across the primary winding and periodically reversing the polarity of that direct voltage across the primary winding. The switch control circuitry contains elements for producing a gap period between the turn-off of one switch and the turn-on of the other switch, during which both switches are open and the primary winding is disconnected from the direct voltage, the producing elements providing a gap period duration selected to correspond to the time required for voltage in the secondary winding to automatically reverse polarity at the inherent resonant frequency of the transformer and rectifier unit.

3 Claims, 13 Drawing Figures

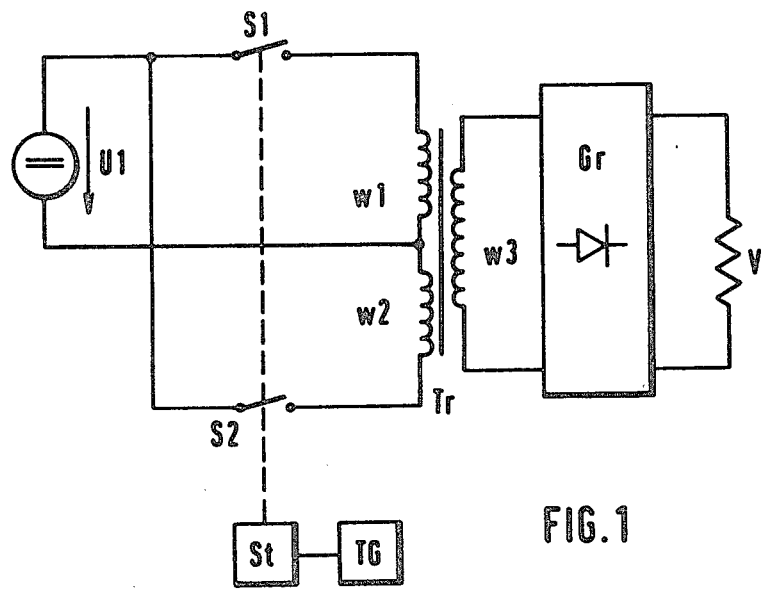
FIG.1
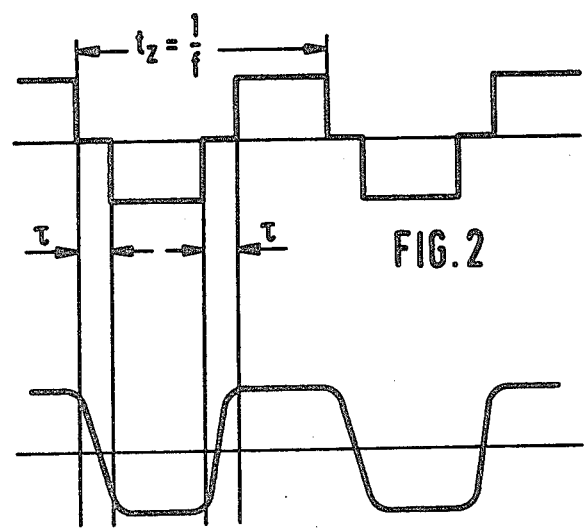
FIG.2
FIG.3

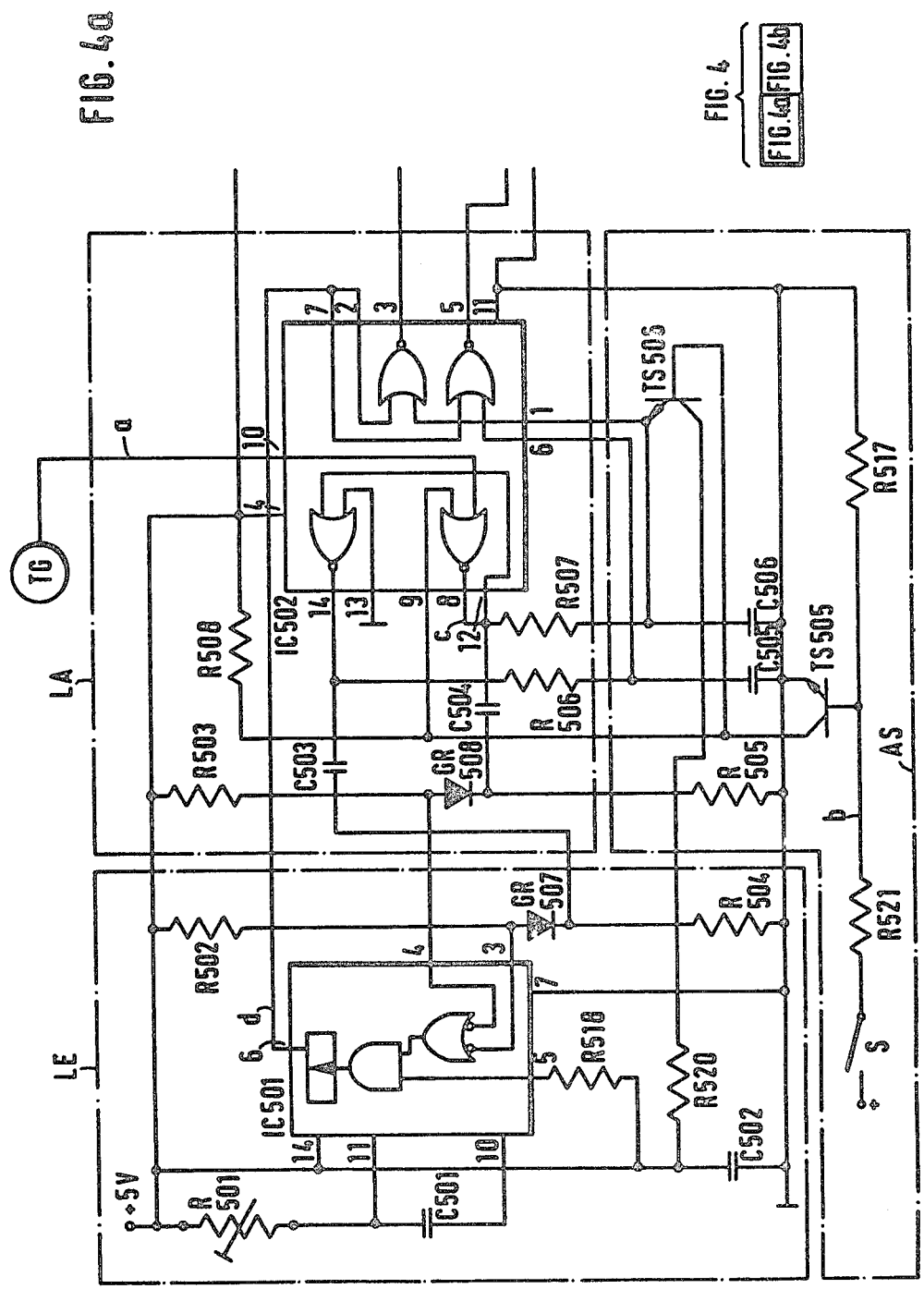

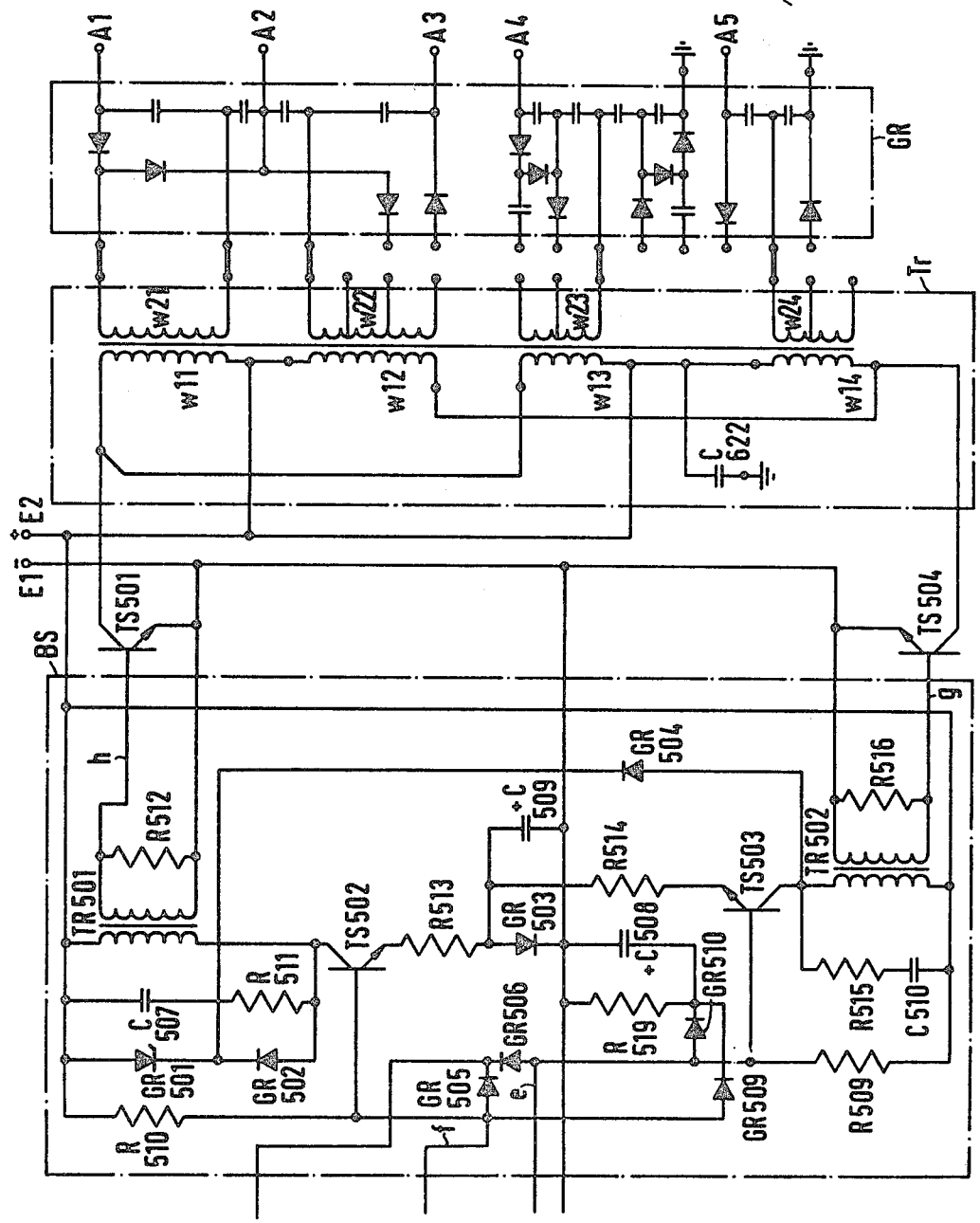

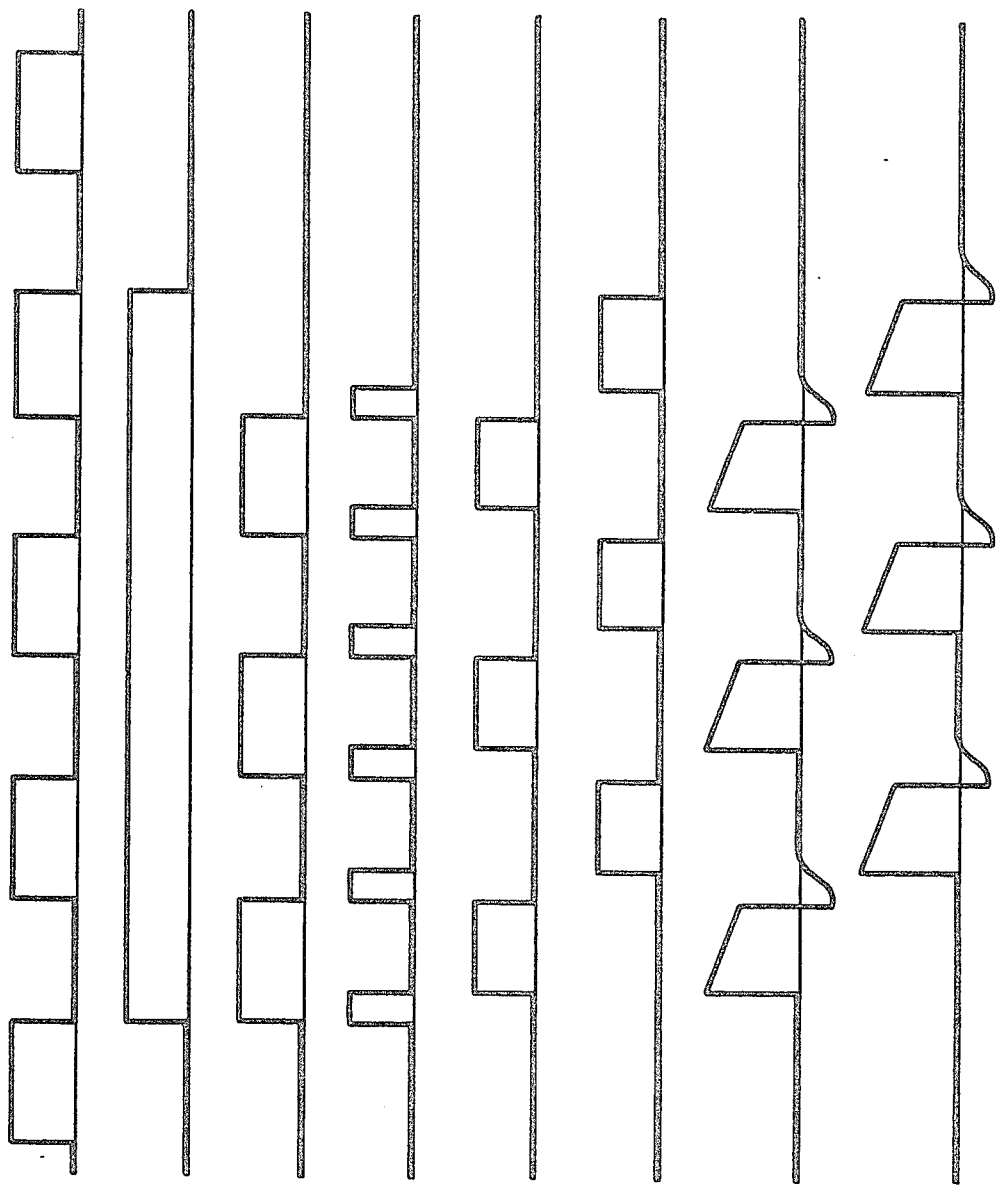

DC/DC CONVERTER

BACKGROUND OF THE INVENTION

The present invention relates to a direct voltage-to-direct voltage converter including a transformer whose primary windings are connected periodically, via first and second electronic switches and with alternating polarity, to a constant voltage source and whose secondary windings are connected to a load via rectifying elements, with the electronic switches receiving turn-on pulses at a preselectable repetition rate from a control device which is synchronized by a clock pulse generator.

Siemens-Zeitschrift [Siemens Magazine] 48 (1974) No. 11, pages 840 to 846, specifically FIGS. 2 and 3, discloses a voltage converter operating according to the resonance principle. The direct voltage converter disclosed therein includes a resonance capacitor which is connected, via the respectively conducting first or second electronic switch, in series with the input voltage source and the primary winding of the transformer. The repetition rate with which the two electronic switches are alternatingly switched on is selected to be exactly as high as the resonant frequency of the resonant circuit formed of the resonance capacitor and the series inductance of the transformer.

With a square wave voltage, this converter generates a sinusoidal current whose zero passages coincide with the points at which the voltage is switched. In this converter operating according to the current resonance principle, the efficiency is high and the peak current stress on the electronic switches is low. However, it requires additional components, for example a resonance capacitor whose resistance losses reduce efficiency. Moreover, the repetition rate for the turn-on pulses cannot be selected freely but is determined by the characteristics of the resonance capacitor as well as by the inductance of the transformer, which is undesirable for many applications. High demands with respect to alternating current stability and capacitance value stability are placed on the resonance capacitor. Moreover, in the described converter there exists the danger of overloading the electronic switch during polarity reversal, i.e. during the transition from opening the first electronic switch to closing the second electronic switch.

SUMMARY OF THE INVENTION

It is therefore an object of the present invention to provide a converter of the above-mentioned type which can operate without additional resonance determining elements, performs with the highest possible efficiency, does not overly stress the electronic switches and generates few inherent interference signals.

The above and other objects are achieved, according to the invention, by the provision of a novel DC/DC voltage converter composed of: a transformer having at least one primary winding and at least one secondary winding; first and second electronic switches connected to the primary winding; a rectifier unit connecting the secondary winding to a load; and switch control circuitry connected to the electronic switches for closing the switches periodically and in alternation at a selected repetition rate in response to pulses produced by a clock pulse generator, for applying a direct voltage across the primary winding and periodically reversing the polarity of that direct voltage across the primary winding, the switch control circuitry including elements for producing a gap period between the turn-off of one switch and the turn-on of the other switch, during which both switches are open and the primary winding is disconnected from the direct voltage, the producing elements providing a gap period duration selected to correspond to the time required for voltage in the secondary winding to automatically reverse polarity at the inherent resonant frequency of the transformer and rectifier unit.

U.S. Pat. No. 3,596,165 discloses a DC/DC converter operating according to the current resonance principle. A gap period is provided there for the electronic switches in which they are without current. However, this gap period is determined by the astable behavior of a multivibrator, or is varied, depending on the magnitude of the output voltage to regulate the turn-on pulses of the electronic switches in the sense of a pulse width modulation. U.S. Pat. No. 3,596,165 does not provide a teaching for selecting the gap period in a manner comparable to that of the present invention.

The converter according to the present invention is distinguished by the fact that the automatic swinging over of the system, including the transformer and rectifier elements with all stray inductances and stray capacitances, produces optimum efficiency and no current peaks occur in the electronic switches. Based on the gap period according to the invention, the direct voltage at the input of the converter is converted into a trapezoidal alternating voltage which is particularly free of harmonics and overshooting. Consequently, the amount of filters required on the secondary side after rectification, to achieve a particular degree of filtering, can be kept small. A further advantage of the trapezoidal wave compared to a sinusoidal wave is that it makes possible a lower internal resistance of the direct voltage source at the secondary.

With the direct voltage converter according to the invention it is possible to realize very high voltage step up ratios since stray capacitances and inductances of the transformer play only a subordinate role.

Spreads between units such as with respect to winding capacitances, which occur inevitably during mass production of transformers, can be compensated during tuning of the direct voltage converter—by way of a slight adjustment in the gap period. Controlled removal of minority carriers of the rectifier elements on the secondary is easily possible with the direct voltage converter according to the invention.

Very low input voltages can be transformed up with the converter according to the invention, which is of advantage, for example, when solar cells are used as the input voltage source.

The converter according to the invention will now be explained in greater detail with the aid of the drawings.

BRIEF DESCRIPTION OF THE DRAWING

FIG. 1 is a block circuit diagram of one preferred embodiment of a converter according to the invention.

FIG. 2 is a signal waveform diagram illustrating the switching play of the electronic switches in a converter according to the invention.

FIG. 3 is a signal waveform diagram illustrating the curve of the voltage across the transformer of a converter according to the invention.

FIGS. 4a and 4b are two parts of a detailed circuit diagram for one form of construction of the converter according to the invention.

FIGS. 5a to 5h are pulse waveform diagrams illustrating the operation of the converter shown in FIGS. 4a and 4b.

DESCRIPTION OF THE PREFERRED EMBODIMENTS

In the circuit shown in FIG. 1, the primary windings w1 and w2 of a transformer Tr are connected periodically and alternatingly to a source of a constant voltage U. When the first electronic switch S1 receives its turn-on pulse from a control unit St, which is synchronized by means of a clock pulse generator TG, the voltage source U1 is connected across the primary winding w1. Correspondingly, during the next clock pulse the voltage U1 is alternately connected, by closing of switch S2, across the primary winding w2. The process of chopping the direct input voltage is performed at a frequency f, i.e. a complete switching cycle during which each switch S is closed once, requires the time $t_z = 1/f$.

If now the time during which the first electronic switch S1 is switched on, i.e. is closed, is called $t_+$ and the time during which the second electronic switch S2 is switched on is called $t_-$, and if $$t_+ = t_- = t/2$$

the voltage applied to transformer Tr would be switched in polarity at infinite speed i.e. in zero time, during a polarity change, i.e. switch S1 opens and switch S2 closes, or vice versa, simultaneously.

Due to the capacitance components, e.g. stray capacitances, winding capacitances, diode capacitances, transformed in the primary circuit, the result would be very high current peaks and poor efficiency. Instead of depending on accidentally existing transistor turn-on times, the present invention provides a precisely defined gap period $\tau$ during which both switches are open. The chopping process thus takes place in such a manner that the two primary windings are each connected across voltage U1 for a period $t_z/2 - \tau$. During each gap period $\tau$ both electronic switches S1 and S2 are open and thus do not conduct any current.

The resulting switching play of the electronic switches S1 and S2 is shown in FIG. 2. The turn-on pulses above the zero line are associated with S1, the turn-on pulses below the zero line are associated with S2.

The gap period is selected in such a manner that during this time, the system including transformer Tr and all inductive and capacitive components considered by the equivalent circuit diagram and the rectifier elements on the secondary side, combined in Gr, automatically swings over at its own resonant frequency to the respectively opposite polarity. Full wave arrangements, voltage doubling arrangements or cascade arrangements can be used as rectifier circuits.

A trapezoidal alternating voltage, shown in FIG. 3, is obtained across transformer secondary winding w3. This voltage has no overshoots and a very low harmonics content. Due to the small amount of harmonics, the expenditures for smoothing, or filter, circuitry at the secondary can be kept low. After rectification of the alternating trapezoidal voltage, a direct voltage source with low internal resistance is available for the load V to be supplied.

The detailed circuit diagram of FIGS. 4a and 4b and the associated pulse diagrams of FIG. 5 will serve to now explain in greater detail operation of the converter and the particular function of an exemplary control unit St. In principle, numerous different embodiments are possible for the gap period generation according to the present invention.

The control unit St of FIGS. 4a and 4b includes, as shown in FIG. 4a, a circuit block LE to generate a signal determining the gap time, a circuit block LA to divide the gap signal into positive and negative pulses and a circuit block AS for processing a turn-on instruction. The electronic switches S1 and S2 are constituted by transistors TS501 and TS504. The bases of transistors TS501 and TS504 are actuated by respective ones of two driver stages combined in a circuit block BS.

The circuit block BS of FIG 4b includes, inter alia, two driver transistors TS502 and TS503 which receive their switching instructions via two NOR gates provided by an integrated circuit unit IC502 in circuit block LA, as well as two driving transformers TR501 and TR502.

Transformer Tr has a plurality of primary windings w11, w12, w13 and w14, as well as a corresponding plurality of secondary windings w21, w22, w23, and w24, each coupled to a respective primary winding, for generating a plurality of independent output voltages.

The circuit block GR includes a plurality of rectifier elements and capacitors which can be connected, depending on the desired output voltage of the converter, with selected terminals of the secondary windings of Tr. The direct input voltage to the converter is supplied via terminals E1 and E2. Depending on the particular case of use, voltages of different magnitude can be obtained at output terminals A1, A2, A3, A4 and A5 for the connected load.

Circuit block LA includes four NOR gates, combined in unit IC502, each having two inputs. The clock pulse train from clock pulse generator TG, shown in FIG. 5a, is applied via pin 10 to the first input of the first NOR gate. The second input of this NOR gate is controlled via pin 9 by a transistor TS505. In the nonconducting state of transistor TS505 the second input of the first NOR gate is maintained at logic H potential via resistor R508.

The base voltage of transistor TS505 is indicated in FIG. 5b, a positive voltage corresponding to the conductive state of this transistor. If switch S is open, no positive potential reaches the base of TS505. Therefore this transistor is nonconductive and no clock pulses from TG can appear at pin 8 connected to the output of the first NOR gate, so that this output remains at logic L potential. If transistor TS505 is conductive, the inverted clock pulse from TG appears at the output of the first NOR gate, i.e. at pin 8. The signal at pin 8 is shown in FIG. 5c.

A monoflop included in an integrated circuit unit IC501 is now triggered via a differentiating stage including a capacitor C504 and resistors R503 and R505, by the leading edge of each inverted clock pulse. As will be described below, the monoflop is also triggered by the leading edge of each non-inverted clock pulse. At output pin 6 of IC501, the monoflop furnishes a pulse sequence, shown in FIG. 5d, whose pulses each correspond in duration to the selected gap time. The RC member R501 and C501 connected to IC501 constitutes a frequency determining member for varying the gap time, for example by varying the resistance value of R501.

If the inverted clock pulse signal appears at pin 8, the output of the first NOR gate, the second NOR gate is activated via its input connected to pin 12 of IC502. At its output, connected to pin 14, there appears a pulse sequence which is likewise differentiated by means of a differentiating stage including capacitor C503 and resistors R502 and R504. The output of this differentiating stage is also fed to the monoflop in unit IC501. The monoflop is thus triggered by each leading and trailing edge of each pulse.

By means of two further NOR gates in unit IC502, the inverted clock pulse and the doubly inverted clock pulse (the latter being identical to the non-inverted clock pulse) are combined with the output signal of the monoflop. Therefore, shortened actuating pulses appear at the outputs of the further NOR gates, i.e. at pins 5 and 3 of IC502. In order to compensate the signal travel time in the monoflop, two RC delay members R506/C505 and R507/C506 are included in the input leads to these further NOR gates.

The output signals of the further NOR gates of IC502 are shown in FIG. 5e for pin 5 and FIG. 5f for pin 3. Each of these output signals controls the base of a respective one of the driving transistors TS502 and TS503. At their collectors, TS502 and TS503 are connected to the driver transformers TR501 and TR502, respectively. The secondaries of the driver transformers are connected to the bases of respective power transistors TS501 and TS504. The waveform of the base current of TS504 is shown in FIG. 5g and that of TS501 is shown in FIG. 5h.

During the turn-on times, a magnetization current is built up in the driver transformers. The base current pulses of transistors TS501 and TS504 therefore have a downward slope.

After either transistor TS502 or TS503 is turned off, the inductively stored current flows in the opposite direction into the base of TS501 or TS504, respectively; therefore the turn-off process for the power transistors is accelerated considerably.

Diodes GR501, GR502 and GR504 limit the flyback voltages of both driver transformers. The RC members C507/R511 and C510/R515 attenuate parasitic oscillations.

The converter according to the invention can of course be designed in various ways, for example as a bridge converter including two pairs of electronic switches.

Elements which are shown in FIG. 4 but are not specifically described function in conventional ways.

In the circuit given IC 501 was the type SN 5121, IC 502 was the type Sn 5402. However, functions performed with these IC's may be realized with any other variety of timing devices.

The gap time, $\tau$, is determined by the resonance frequency of the transformer. Depending on switching frequency, f, useful gap times will be in the range of 5% to 30% of the period $t_Z = 1/f$.

A typical range for the switching frequency, f, is 10 to 100 kHz.

It will be understood that the above description of the present invention is susceptible to various modifications, changes and adaptations, and the same are intended to be comprehended within the meaning and range of equivalents of the appended claims.

What is claimed is:

1. A direct voltage converter comprising: a transformer having primary and secondary winding means; first and second electronic switches connected to said primary winding means; rectifier means connecting said secondary winding means to a load; and switch control means connected to said electronic switches for closing said switches periodically and in alternation at a selected repetition rate in response to pulses produced by a clock pulse generator, for applying a direct voltage across said primary winding means and periodically reversing the polarity of that direct voltage across said primary winding means, said switch control means comprising means for producing a gap period between the turn-off of one said switch and the turn-on of the other said switch, during which both said switches are open and said primary winding means are disconnected from the direct voltage, said producing means providing a gap period duration selected to correspond to the time required for voltage in said secondary winding means to automatically reverse polarity at the inherent resonant frequency of said transformer and rectifier means.

2. A converter as defined in claim 1 wherein said producing means comprise elements for adjusting the gap period duration.

3. A converter as defined in claim 1 wherein said means for producing a gap period are conductively connected to the clock pulse generator.

* * * * *